Patented Nov. 9, 1943

2,334,067

UNITED STATES PATENT OFFICE 2,334,067

PREPARATION OF THIAMINE DERIVATIVES

Leopold R. Cerecedo, New York, N. Y., and Jacob G. Tolpin, Chicago, Ill.

No Drawing. Application February 15, 1941, Serial No. 379,044

12 Claims. (Cl. 260—251)

This invention relates to the preparation of thiamine compounds, and more particularly to the production of thiamine iodide hydroiodide and certain compounds useful in the synthesis of thiamine iodide hydroiodide as well in synthesizing other thiamine halogen compounds.

Various methods of synthesizing vitamin $B_1$ in the form of its active chlorine and bromine salts are known. It is also known to prepare these thiamine salts in crystalline form from the vitamin present in natural food substances.

It is one of the further objects of our invention to provide a new method of making halogen salts of thiamine, and more particularly a method of making thiamine iodide hydroiodide.

A still further object of our invention is to prepare the vitamin $B_1$ base substance, thiamine, and to use this base compound as an intermediate in preparing the various halogen salts of thiamine as well as for other purposes.

Thiamine iodide hydroiodide has the general formula:

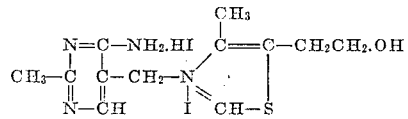

According to one specific example of the method we have devised and employed in preparing thiamine iodide hydroiodide, 0.125 g. thiamine chloride hydrochloride were dissolved in 9 cc. glacial acetic acid to which 2–3 drops of water were added. 0.126 g. metallic sodium were gradually added under stirring or shaking to the solution kept under a reflux condenser. The solution which still showed an acid reaction was then evaporated under reduced pressure and the residue extracted with 15 cc. of dry chloroform for 1–2 hours. The extract was treated with a 57% aqueous solution of hydrogen iodide, which was added in small drops while stirring. A crystalline precipitate formed on the bottom. This precipitate was separated from the mother liquor, washed with boiling ether for about one-half hour and recrystallized by dissolving in boiling methyl alcohol and precipitating with dry ether. The resulting crystalline precipitate melted with decomposition at 230–231° C. On analysis this compound showed the following percentages of the constituent elements by weight as compared with the percentages obtained by calculations:

|   | Calculated | Found |
|---|---|---|
| N | 10.77 | 10.83 |
| S | 6.15 | 6.07 |
| I | 48.85 | 48.60 |
| C | 27.69 | 27.81 |
| H | 3.46 | 3.54 |

Instead of using chloroform as the extractant, various other suitable organic solvents may be employed. For example, similar results have been obtained with the use of ether.

Various other modifications in the details of the procedure may be made without departing from the invention. For example, the addition of the hydrogen iodide in absolute alcohol solution, although delaying somewhat the precipitation of the crystals, was found to produce a purer product. Stirring or slight warming will also accelerate the precipitation.

Treatment of an ether extract produced as above with a 40% solution of hydrogen bromide gave thiamine bromide hydrobromide melting at 218–221° C. and analyzing N, 13.11%, as compared with the theoretical of N, 13.14%.

It will be understood that in the initial step in the method above outlined, the chlorine atoms of the thiamine chloride hydrochloride are removed by the sodium, forming sodium chloride and leaving the thiamine base intact. The stability of the vitamin principle when thus treated with sodium in the presence of glacial acetic acid is surprising when it is borne in mind that the vitamin appears to be decomposed when treated by several other rather similar methods. It appears that the acetic acid when present with sodium exhibits a buffering action. It will be understood that in lieu of glacial acetic acid other weak organic acids may be employed, such as, for example, lactic acid, propionic acid and glycollic acid. Other liquid organic compounds which have a buffering action and prevent the decomposition of the vitamin base principle by metallic sodium may be employed.

The thiamine base product produced by reaction of the halogen salt with metallic sodium in the presence of a buffering agent has other uses besides being an intermediate material useful in the preparation of the thiamine iodide salt. Its solubility in various organic solvents lends to it enhanced usefulness as an intermediate in the synthesis of various useful organic compounds.

It will be understood that various other solvents and reagents than those hereinbefore mentioned may be employed to assist in carrying out the reactions and to purify the product obtained. Moreover, various changes in the proportions of the ingredients, the time and the temperature of the reactions, may be made without departing from the invention which is not to be deemed as limited other than as indicated in the appended claims.

We claim:

1. The method of making thiamine iodide hydroiodide which comprises treating thiamine chloride hydrochloride with sodium in the presence of glacial acetic acid, recovering the thiamine compound formed and reacting said compound with hydrogen iodide.

2. The method of making thiamine iodide hydroiodide which comprises reacting thiamine chloride hydrochloride with sodium in the presence of glacial acetic acid, evaporating the resulting mixture to dryness, extracting the thiamine content thereof, reacting the extracted thiamine compound with hydrogen iodide and thereby producing thiamine iodide hydroiodide.

3. The method of making thiamine iodide hydroiodide which comprises treating thiamine chloride hydrochloride with sodium in the presence of glacial acetic acid, recovering the thiamine compound formed and reacting said compound with a hydrogen iodide solution.

4. The method of making thiamine iodide hydroiodide which comprises treating thiamine chloride hydrochloride with sodium in the presence of glacial acetic acid, recovering the thiamine compound formed and reacting said compound in an aqueous solution of hydrogen iodide.

5. The method of making thiamine iodide hydroiodide which comprises treating thiamine chloride hydrochloride with sodium in the presence of glacial acetic acid, recovering the thiamine compound formed and reacting said compound in an alcoholic solution of hydrogen iodide.

6. The method of preparing the thiamine base principle of vitamin $B_1$ which comprises reacting a thiamine halogen salt with sodium in the presence of a buffering organic liquid.

7. The method of preparing the thiamine base principle of vitamin $B_1$ which comprises reacting a thiamine halogen salt with sodium in the presence of a buffering organic acid.

8. The method of making the thiamine base principle of vitamin $B_1$ which comprises reacting thiamine chloride hydrochloride with sodium in the presence of a buffering organic acid.

9. The method of preparing the thiamine base principle of vitamin $B_1$ which comprises reacting a thiamine halogen salt with sodium in the presence of a weak organic acid.

10. The method of making the thiamine base principle of vitamin $B_1$ which comprises reacting thiamine chloride hydrochloride with sodium in the presence of a weak organic acid.

11. The method of preparing the thiamine base principle of vitamin $B_1$ which comprises reacting a thiamine halogen salt with sodium in the presence of glacial acetic acid.

12. The method of making the thiamine principle of vitamin $B_1$ which comprises reacting thiamine chloride hydrochloride with sodium in the presence of glacial acetic acid.

LEOPOLD R. CERECEDO.
JACOB G. TOLPIN.